(12) United States Patent
Lai et al.

(10) Patent No.: US 8,308,073 B2
(45) Date of Patent: Nov. 13, 2012

(54) RADIO FREQUENCY IDENTIFICATION (RFID) TAG

(75) Inventors: Kin Yue Albert Lai, Hong Kong (HK); Jerry Garrett, Hong Kong (HK); Yi Wah Chan, Hong Kong (HK)

(73) Assignee: Convergence Systems Limited, Wanchai (HK)

( * ) Notice: Subject to any disclaimer, the term of this patent is extended or adjusted under 35 U.S.C. 154(b) by 0 days.

(21) Appl. No.: 13/155,906

(22) Filed: Jun. 8, 2011

(65) Prior Publication Data

US 2011/0303751 A1    Dec. 15, 2011

Related U.S. Application Data

(60) Provisional application No. 61/354,758, filed on Jun. 15, 2010.

(51) Int. Cl.
*G06K 19/06* (2006.01)

(52) U.S. Cl. .................................... 235/492; 700/224
(58) Field of Classification Search .................. 235/492; 700/224

See application file for complete search history.

(56) References Cited

U.S. PATENT DOCUMENTS

| | | | | |
|---|---|---|---|---|
| 6,421,013 | B1 * | 7/2002 | Chung | 343/700 MS |
| 7,230,580 | B1 * | 6/2007 | Kelkar et al. | 343/870 |
| 7,705,734 | B2 * | 4/2010 | Martinelli | 340/572.8 |
| 7,913,917 | B2 * | 3/2011 | Speich | 235/492 |
| 2006/0261950 | A1 * | 11/2006 | Arneson et al. | 340/572.1 |
| 2008/0119957 | A1 * | 5/2008 | Ellis et al. | 700/224 |

* cited by examiner

*Primary Examiner* — Daniel Hess
(74) *Attorney, Agent, or Firm* — William J. Sapone; Coleman Sudol Sapone P.C.

(57) ABSTRACT

A radio frequency identification (RFID) tag is disclosed as including an integrated circuit and at least one antenna connected with the integrated circuit, wherein the antenna is formed of an at least partly metalized thread.

8 Claims, 12 Drawing Sheets

RADIO FREQUENCY IDENTIFICATION (RFID) TAG

CROSS REFERENCE TO RELATED APPLICATIONS

This application claims priority from U.S. Provisional Patent Application No. 61/354,758 filed on 15 Jun. 2010.

TECHNICAL FIELD

This invention relates to a radio frequency identification (RFID) tag and various applications of such an RFID tag.

BACKGROUND

With the rapid popularity of RFID technology in many industries, its use in the apparel industry is becoming more prominent. Currently, RFID tags are mostly attached to price tags, which may be mounted either at the retail shop, or at the distribution center of the retail shop, or even at the factory. The purpose of RFID tags as attached to the price tags of apparel is mainly for logistics and price management. Often, the RFID tag is used for anti-theft purposes.

An additional purpose that is just becoming a requirement is for anti-counterfeiting purpose. For expensive branded clothing or bags, the need for anti-counterfeiting is of utmost importance. This application of RFID technology is to protect intellectual property rights of the brand and to insure authentication. In this application, just applying an RFID tag to a price tag is not sufficient, as the price tag is a separate item and can be easily counterfeited. The RFID tag must be hidden inside the bag or clothing or made difficult to access.

Another problem of apparel is the process of washing and the need to sort out the ownership of each piece of clothing after the washing cycle. This is particularly important for management of uniforms of hotels, schools, police, military, costumes and etc.

SUMMARY OF THE INVENTION

It is thus an objective of the present invention to provide a novel RFID tag, ways of using such an RFID tag, and methods of attaching such an RFID tag to an object, in which the aforesaid shortcomings can be mitigated.

According to a first aspect of the present invention, there is provided a radio frequency identification (RFID) tag including an integrated circuit and at least one antenna connected with said integrated circuit, wherein said at least one antenna is formed of an at least partly metalized thread.

According to a second aspect of the present invention, there is provided a method of attaching at least one radio frequency identification (RFID) tag to an object, wherein said RFID tag includes an integrated circuit and at least one antenna connected with said integrated circuit, wherein said at least one antenna is formed of an at least partly metalized thread, said method including sewing or weaving at least said thread of said RFID tag to said object.

According to a third aspect of the present invention, there is provided a method of attaching at least one radio frequency identification (RFID) tag to an object, wherein said RFID tag includes an integrated circuit and at least one antenna connected with said integrated circuit, wherein said at least one antenna is formed of an at least partly metalized thread, said method including positioning said thread through or around said object or a part of said object.

According to a fourth aspect of the present invention, there is provided a method of forming a tamper-destruct seal for an object, said method including providing at least one radio frequency identification (RFID) tag, wherein said RFID tag includes an integrated circuit and at least one antenna connected with said integrated circuit, wherein said at least one antenna is formed of an at least partly metalized thread, and associating said thread with said object.

Preferred embodiments of the present invention will now be described, by way of example only, with reference to the accompanying drawings, in which.

DETAILED DESCRIPTION OF THE INVENTION

Figure 1A:
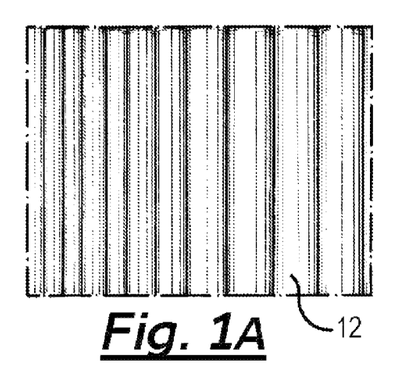
FIGS. 1A to 1E show various objects into or onto which an FRID tag according to the present invention may be embedded or fixedly secured.
Figure 1B:
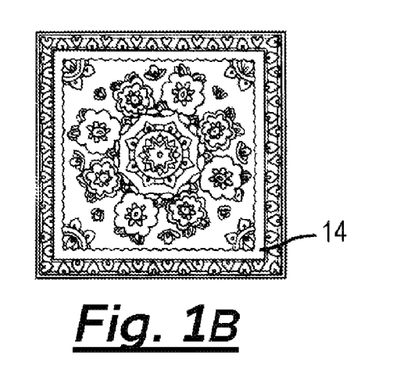
Figure 1C:
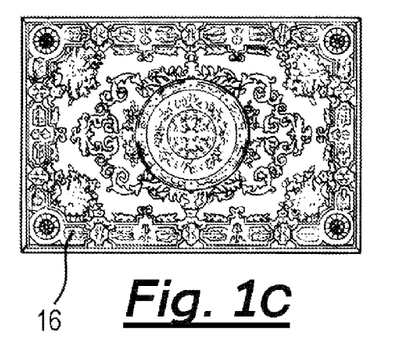
Figure 1D:
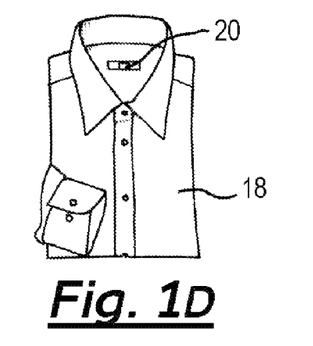
Figure 1E:
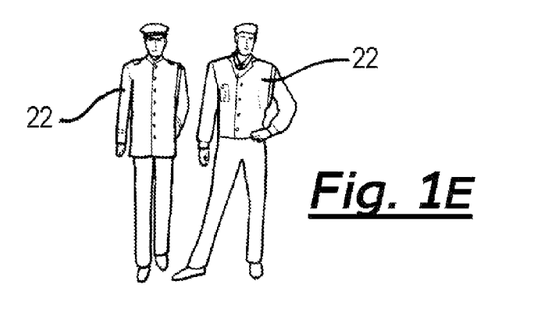

FIGS. 1A to 1E show various objects into or onto which a radio frequency identification (RFID) tag according to the present invention may be secured. FIG. 1A shows a piece of cloth 12 onto which such an RFID tag may be secured; FIG. 1B shows a table cloth 14 onto which such an RFID tag may be secured; FIG. 1C shows a carpet 16 onto which such an RFID tag may be secured; FIG. 1D shows a shirt 18 onto whose label 20 such an RFID tag may be secured; and FIG. 1E shows uniforms 22 onto or into which such an RFID tag may be secured. The RFID tag may also be sewn onto leather or other wearable materials.

Figure 2:
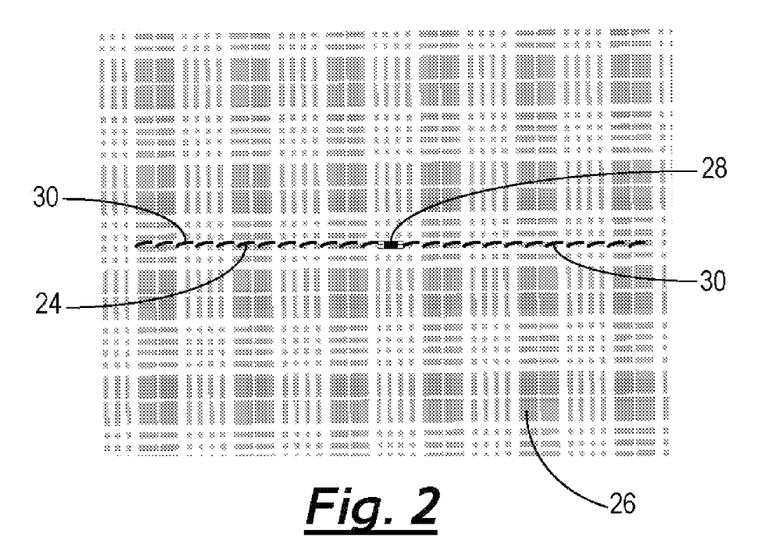
FIG. 2 shows an RFID tag according to the present invention sewn in a piece of cloth.

An RFID tag 24 according to the present invention is shown in FIG. 2 as sewn onto a piece of cloth 26. The tag 24 is shown here as a passive RFID tag, although it should be understood that such may be a battery assisted passive RFID tag or an active RFID tag. The RFID tag 24 includes a flip chip integrated circuit (IC) 28 electrically connected with a pair of metalized threads 30, each forming an antenna of the RFID tag 24. The metalized threads 30 are normal threads, which may be made of cotton or polyester, totally recyclable, with metallization on the surface of the threads 30 or integrated into the threads 30. The threads 30 may be fully metalized or partly metalized with an electrically conductive metal, so as to render the threads 30 electrically conductive. Both fully metalized and partly metalized threads will be herein collectively referred to as "metalized threads". The metalized threads 30 are applied to the piece of cloth 26 by a sewing machine. The IC 28 may first be mounted on another substrate and then also sewn onto the piece of cloth 26. Alternatively, the IC 28 may be sewn onto the clothing label, or to the clothing in its final embodiment.

Figure 3:
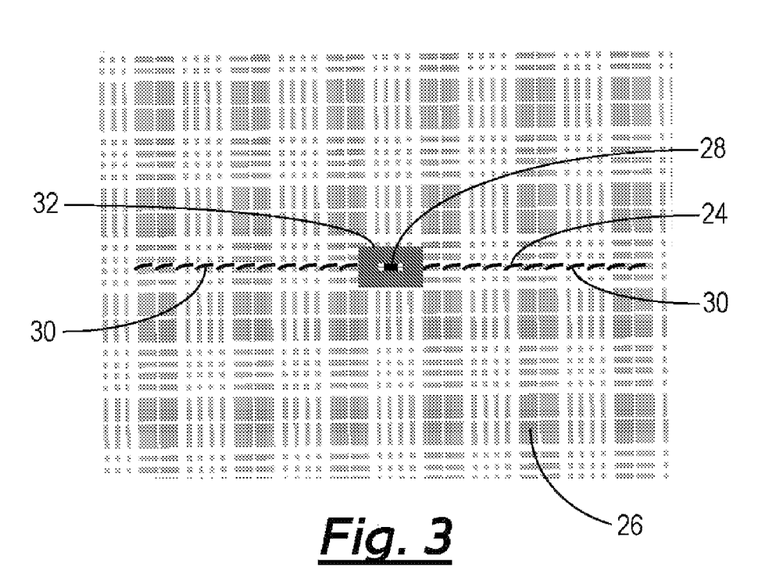
FIG. 3 shows an RFID tag according to the present invention with its centre part mounted on a piece of FR4 printed circuit board.

FIG. 3 shows the RFID tag 24 with its centre part (meaning the IC 28 and part of each of the two metalized thread antennas 30 connected with and closest to the IC 28) mounted on a piece of FR4 printed circuit board (PCB) with a plurality of metalized holes. The antennas 30 are received through and connected with a respective of the metalized holes. The threads 30 are in then sewn onto the piece of cloth 26. The flip chip IC 28 is covered with glue to make it waterproof and to give it structural strength so that it will less likely be loosened out when under mechanical stress.

Figure 4:
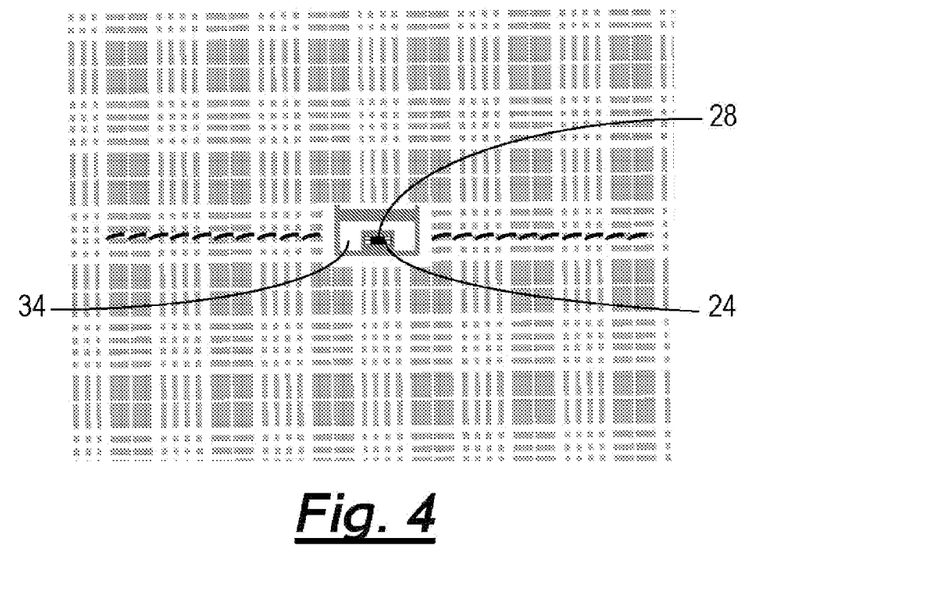
FIG. 4 shows an RFID tag according to the present invention with its centre part mounted on a piece of inlay.
Figure 5:
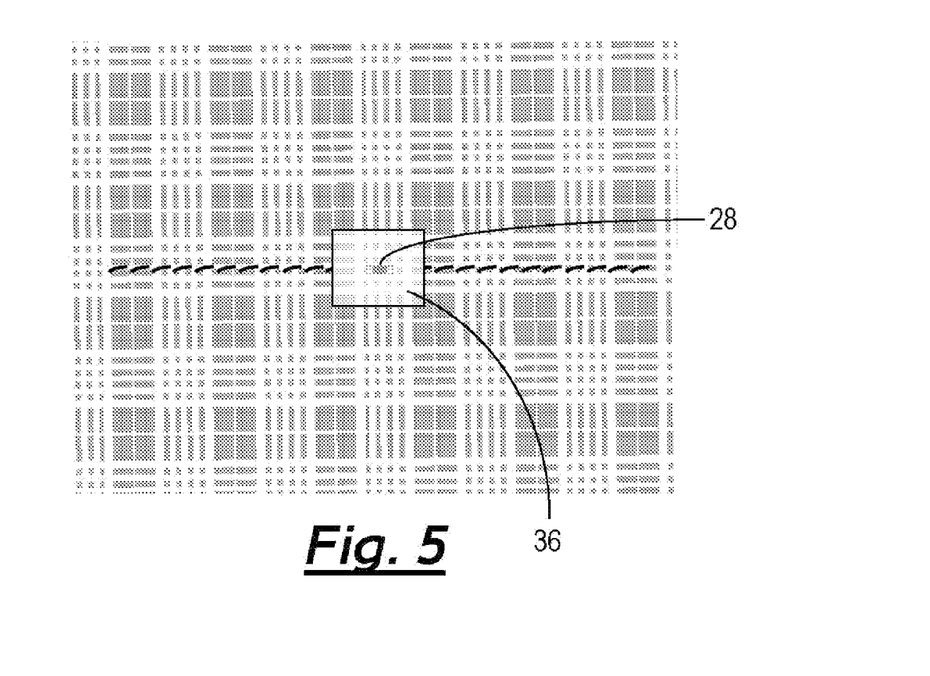
FIG. 5 shows an RFID tag according to the present invention with its centre part on a piece of cloth.

FIG. 4 shows the RFID tag 24 with its IC 28 mounted on a piece of plastic inlay 34. In a further possible arrangement, and as shown in FIG. 5, the flip chip IC 28 is mounted on a piece of cloth 36.

Figure 6:
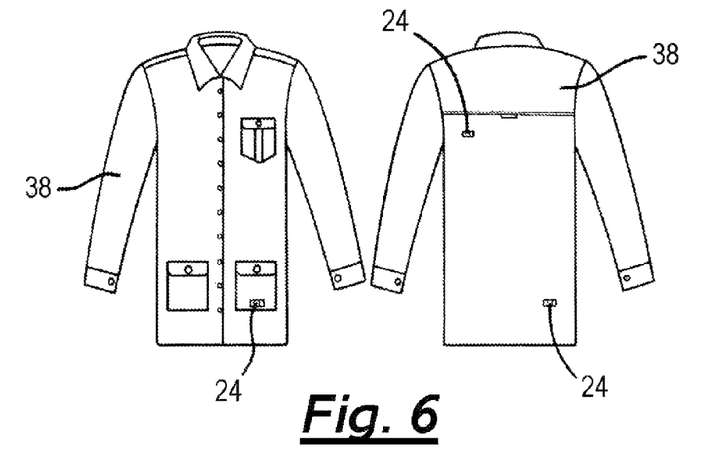
FIG. 6 shows a clothing item, being a shirt, sewn with three RFID tags according to the present invention.

Although each object (be it a piece of cloth, a clothing item, or the like) may be associated with one RFID tag 24 only, it is of course possible to have more than one RFID tag 24 attached to an object. For example, and as shown in FIG. 6, three RFID tags 24 are sewn onto three different parts of a shirt 38 to provide redundancy of reading capacity, so that even if one or more of the RFID tags 24 is blocked or destroyed or in any way incapable of functioning properly, the remaining RFID tag(s) 24 can still respond to a reader request.

Figure 7:
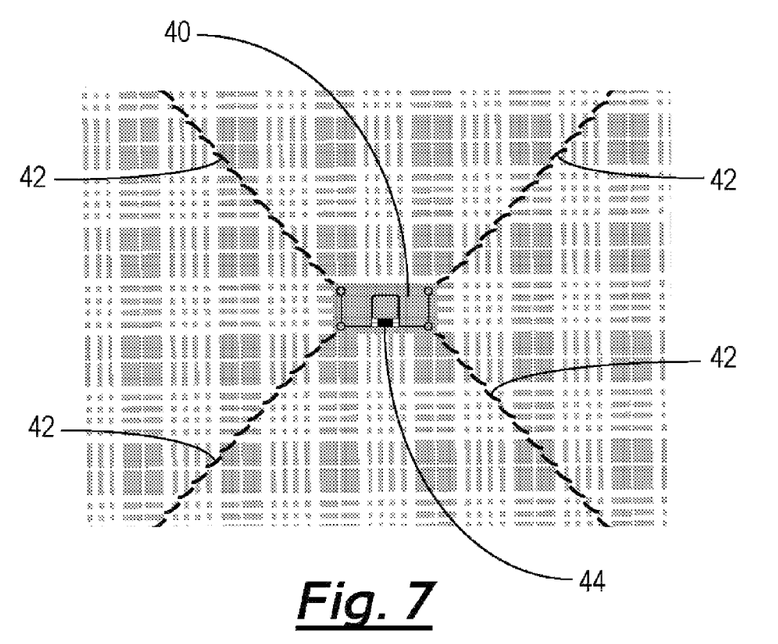
FIG. 7 shows an RFID tag according to the present invention with two dipoles.

FIG. 7 shows another RFID tag 40 with two pairs of metalized thread antennas 42 electrically connected to a central flip chip IC 44, to provide antenna diversity so that reader signals coming in at different polarization can still be read.

Figure 8:
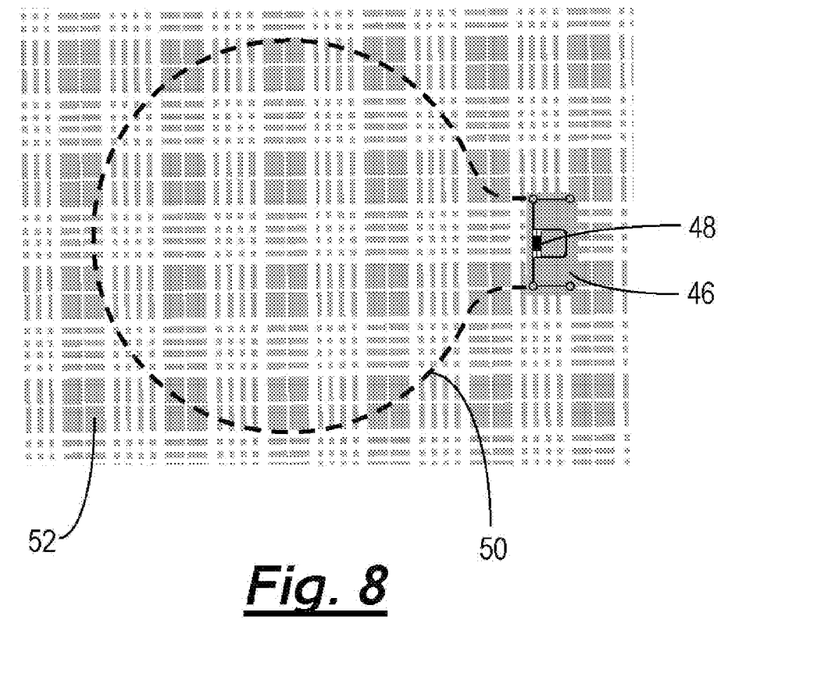
FIG. 8 shows an RFID tag according to the present invention with a loop style antenna.

FIG. 8 shows another RFID tag 46 with a flip chip IC 48 electrically connected to a loop style antenna made of a metalized thread 50. By way of such an arrangement, the RFID tag 46 can be read by a near field antenna based RFID reader, even if the whole piece of clothing or cloth (of which a part 52 is shown) is inside water or close to metal or close to human flesh.

Figure 9A:
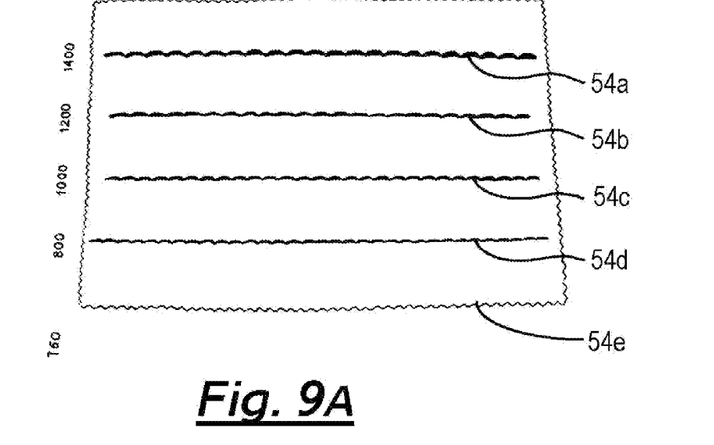
FIGS. 9A and 9B show a number of metalized threads of various diameters, which may used in an RFID tag according to the present invention.
Figure 9B:
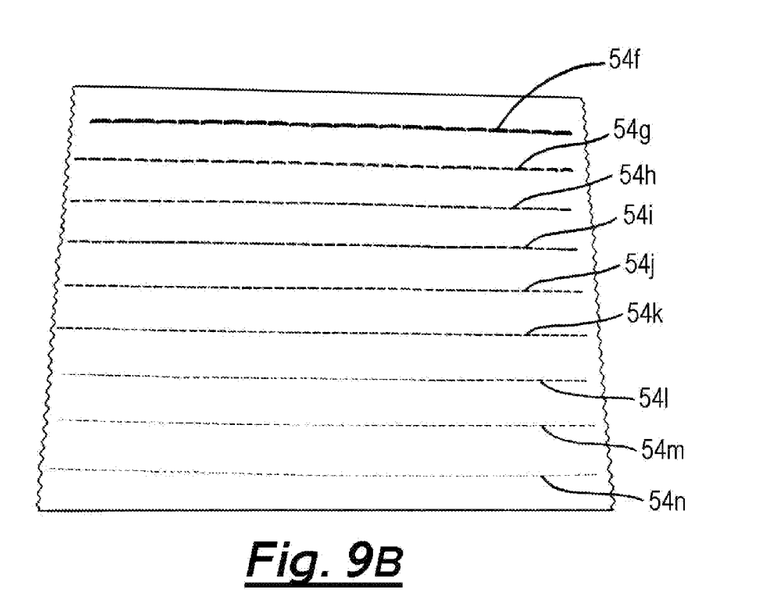

As shown in FIGS. 9A and 9B, metalized threads 54a, 54b, 54c, 54d, 54e, 54f, 54g, 54h, 54i, 54j, 54k, 54l, 54m, 54n for forming antennas of RFID tags according to the present invention may be of various diameters (as shown in FIGS. 9A and 9B) so as to provide various degrees of sensitivity to the RFID tags.

Figure 10:
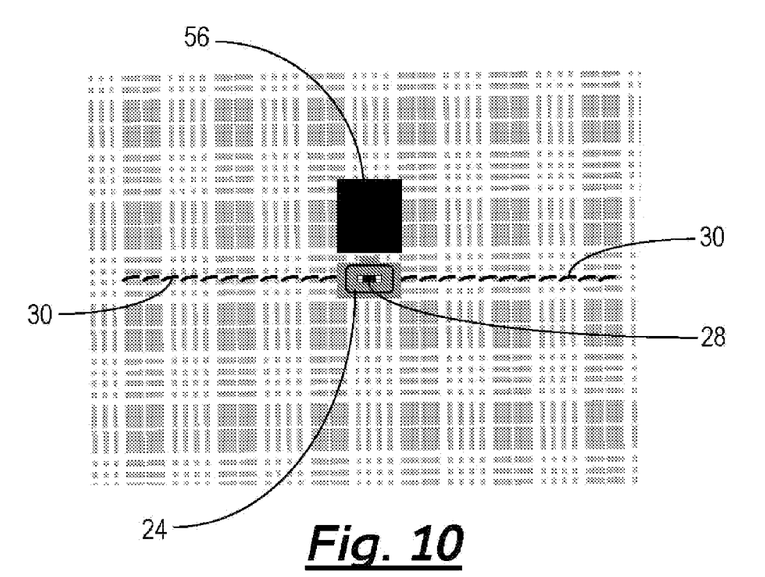
FIG. 10 shows an RFID tag according to the present invention connected with and powered by a thin film battery.

The RFID tags according to the present invention so far discussed are passive RFID tags. As mentioned above, RFID tags according to the present invention may be battery assisted passive RFID tags or active RFID tags. As shown in FIG. 10, the RFID tag 24 according to the present invention with an IC 28 attached with two metalized thread antennas 30 is connected with and powered by a thin film battery 56. The thin film battery 56 is mounted on a piece of cloth or paper, and is then sewn to the object (e.g. a clothing item) to which the RFID tag 24 is to be sewn. This enables the RFID tag 24 to behave as a battery assisted tag, thus allowing ultra long read range.

Figure 11:
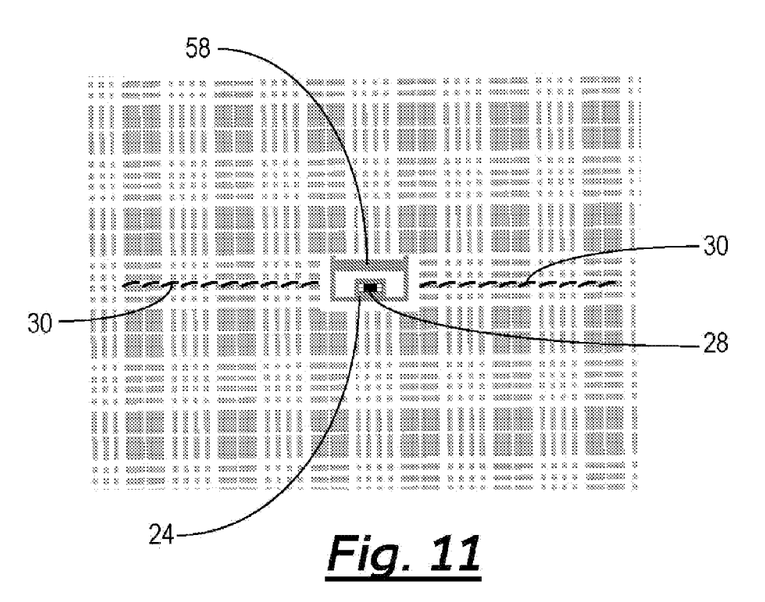
FIG. 11 shows an RFID tag according to the present invention with its centre part covered with plastic to improve or achieve water-proofing.
Figure 12:
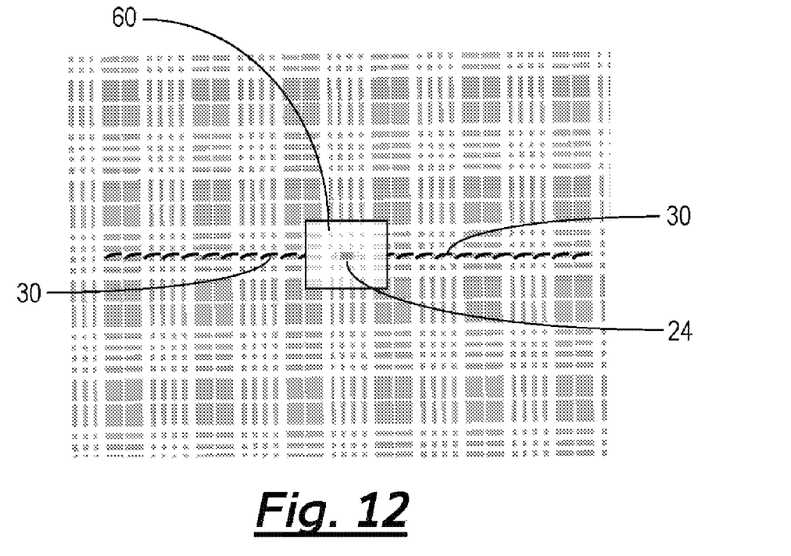
FIG. 12 shows an RFID tag according to the present invention with its centre part covered by a piece of cloth.

As shown in FIG. 11, the RFID tag 24 according to the present invention with a central IC 28 attached with two metalized thread antennas 30 is covered by a piece of malleable conformable plastic material to achieve or improve waterproofing. In addition or as an alternative to being covered by a piece of plastic material, and as shown in FIG. 12, a further piece of cloth 60 may be sewn onto the object to cover the centre part of the RFID tag 24, i.e. the flip chip IC 28 and the part of the metalized thread antennas 30 which are close and connected to the flip chip IC 28.

Figure 13:
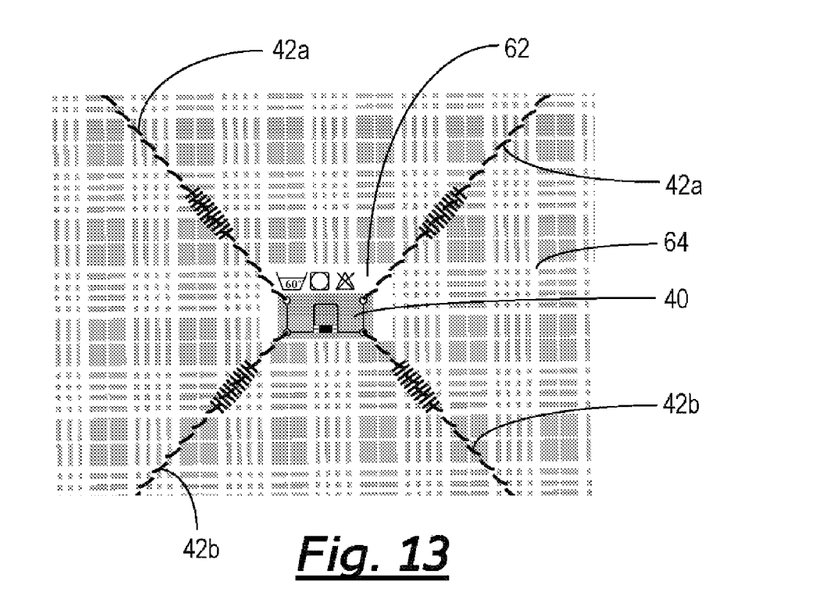
FIG. 13 shows an RFID tag according to the present invention attached to a clothing item and a label of the clothing item.

As shown in FIG. 13, for an RFID tag 40 with two pairs of metalized thread antennas 42a, 42b electrically connected with a central IC, a part of each of the antennas 42a is sewn onto a label 62 of a piece of clothing 64 and a part of each of the antennas 42a is sewn onto the piece of clothing 64. This allows a larger antenna for best read range.

Figure 14:
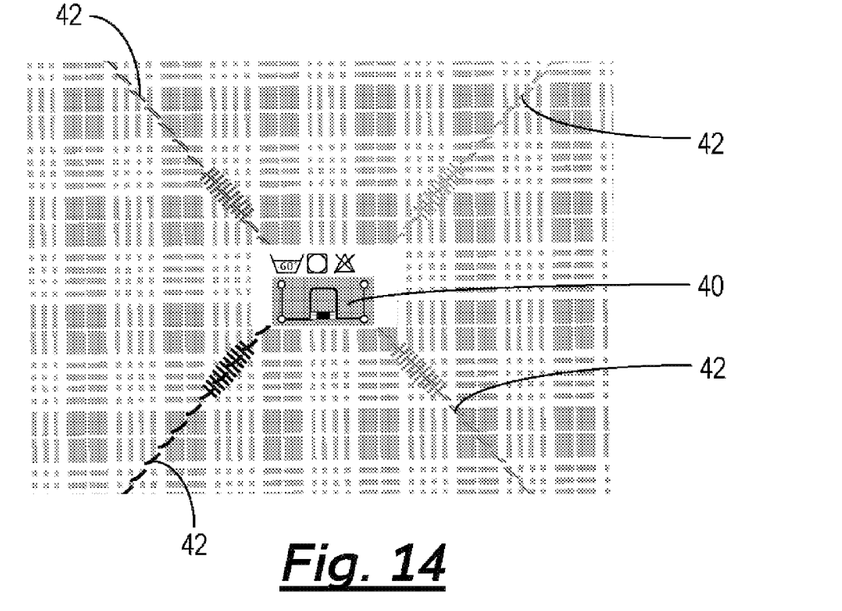
FIG. 14 shows an RFID tag according to the present invention connected with metalized threads of different colours.

As shown in FIG. 14, for an RFID tag 40 with a number of metalized thread antennas 42 connected with a central IC, the antennas 42 may be of different colours, so as to guide the user to use a pair of scissors to cut the proper thread (which may, for example, be of a colour different from that of all other threads) to permanently terminate the operation of the RFID tag 40.

Figure 15:
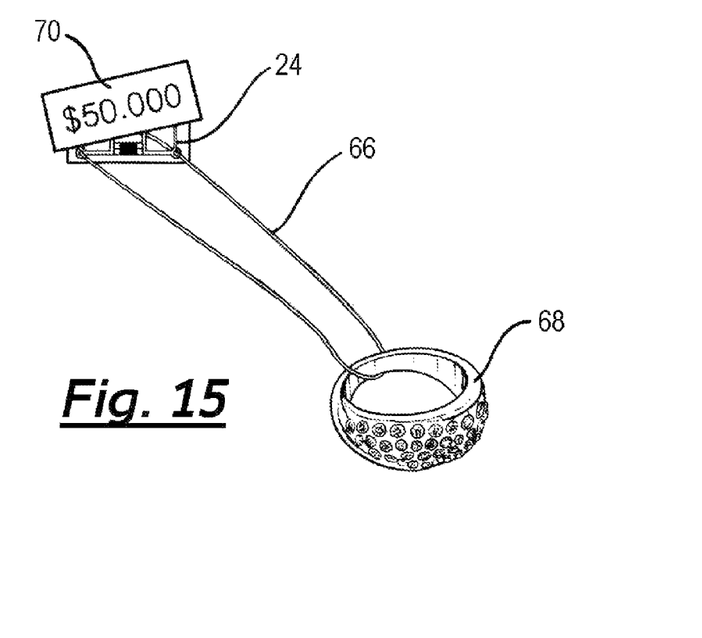
FIG. 15 shows an RFID tag according to the present invention with a metalized thread received through a ring.

Metalized thread based RFID tags have many applications, including the application onto price tags of such jewelry items as gold or jewel rings and watches and other valuable goods in retail shops. As shown in FIG. 15, an RFID tag 24 according to the present invention is attached to a ring 68 by having its loop style metalized thread antenna 66 received through the ring 68. A price tag 70 is attached (e.g. glued) onto the IC of the RFID tag 24. The thread antenna 66 may be fully metalized or partly metalized to obtain different antenna effects.

Figure 16:
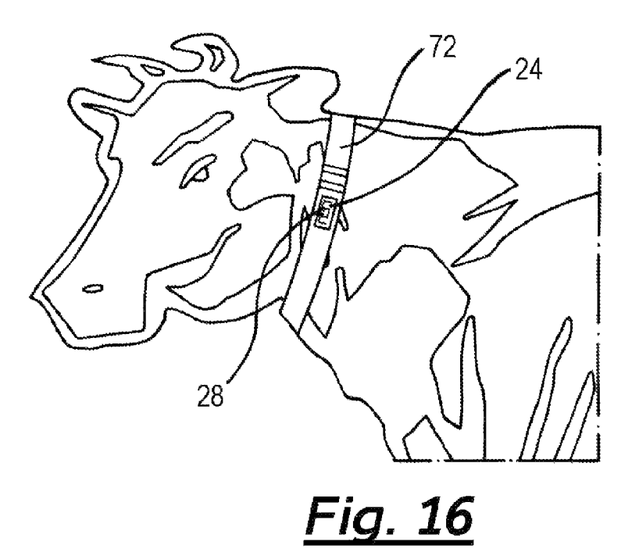
FIG. 16 shows an RFID tag according to the present invention wound around a cow.

As shown in FIG. 16, a metalized thread based RFID tag 24 is shown as being applied to a string or woven collar 72 worn around the neck of a cow. The string or woven collar 72 may be worn around other body parts of other animals, e.g. dogs, cats, or other pets, with the string or woven collar selectively metalized with the proper length according to RF requirements, so as to act as an antenna. A cloth or paper based card may be provided to house the flip chip IC 28. It is found in practice that if the string or woven collar is partially metalized, the read range of the RFID tag 24 (when mounted on the animal) can be maximized.

Figure 17:
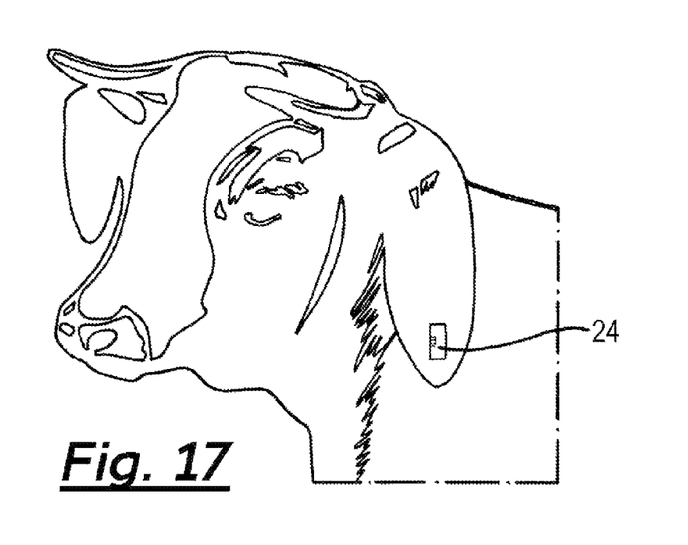
FIG. 17 shows an RFID tag according to the present invention attached to an earlobe of a cow.

As shown in FIG. 17, a metalized thread 30 attached to a central IC of an RFID tag 24 can also be directly sewn into the body of animal or livestock, such as their earlobes, or the fins of fish, and the antenna design can be optimized for the animal body such that the read range can be relatively good. The RFID tag 24 is thereby attached to the animal.

Figure 18:
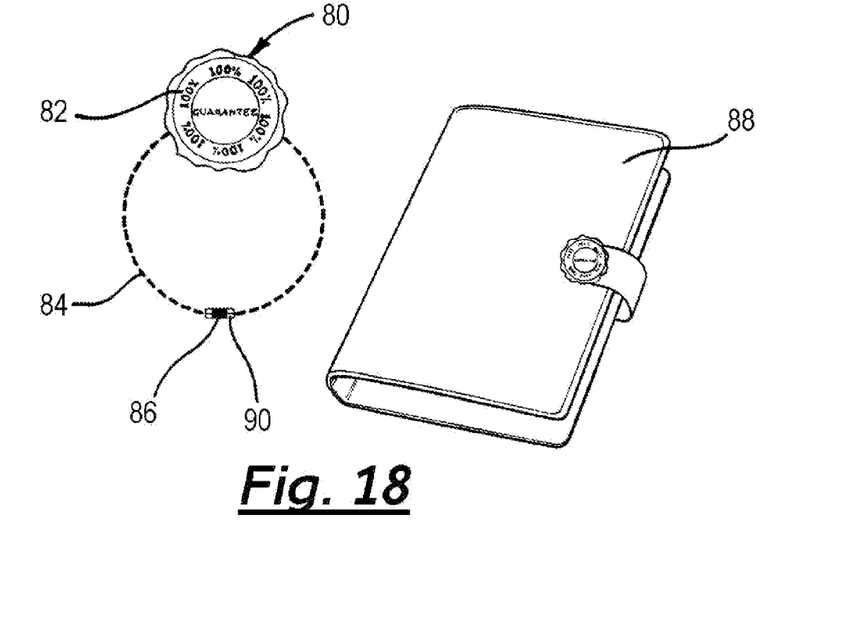
FIG. 18 shows an RFID tag according to the present invention attached to a document as a tamper-destruct seal.

Metalized thread based RFID tags can also be used as tamper-destruct seals for legal documents. A tamper-destruct seal for legal documents is shown in FIG. 18 and generally designated as 80, including a seal 82, a metalized thread antenna 84 and an RFID IC 86 connected with one another. The metalized thread antenna 84 and the IC 86 form an RFID tag 90. A legal document 88 is also shown in FIG. 18 as being protected by the tamper-destruct seal 80. In particular, the tamper-destruct seal 80 is associated with the legal document 88 by having its metalized thread antenna 84 positioned through one or more holes (not shown) of the document 88 in such a manner that any tampering will destroy the antenna 84 and render the tag 90 unreadable beyond a certain distance, thus signaling to the user that the document 88 has been tampered with.

Figure 19:
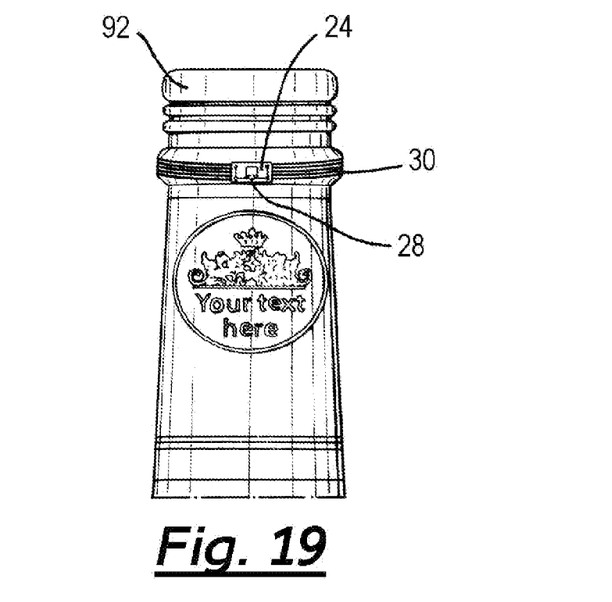
FIG. 19 shows an RFID tag according to the present invention forming part of a container cover as a tamper-destruct seal for the container.

Metalized thread based RFID tags can also be used as tamper-destruct seals for container caps. As shown in FIG. 19, an RFID tag 24 with an RFID IC 28 electrically connected with a metalized thread 30 is associated with a bottle by having the thread 30 fixedly connected to a breakable part of a cap 92 of the bottle. The opening of the cap 92 will break the metalized thread 30 and break the critical conductive path needed in the RFID tag 24, thus disabling the tag 24.

Figure 20:
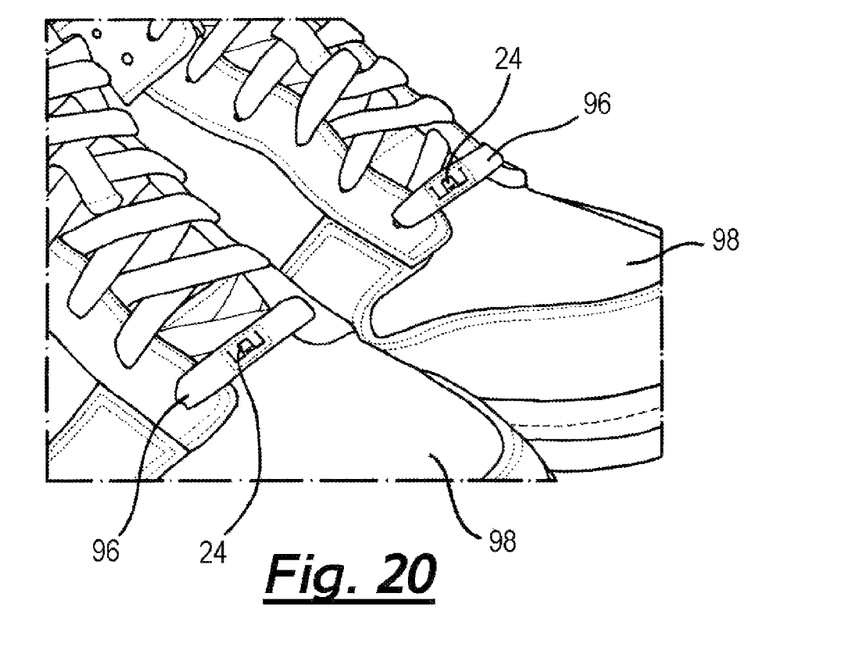
FIG. 20 shows an RFID tag according to the present invention attached to a shoe lace of a shoe.

Metalized thread based RFID tags can also be applied to shoe lace for athletes or kids where their where about or sequence on the road need to be tracked or gauged. In particular, as shown in FIG. 20, a shoe lace 96 of each shoe 98 is sewn with an RFID tag 24 according to the present invention. The metalized thread antennas of the tags 24 are sewn or woven into the shoe laces 96 of the shoes 98 so as to attach the RFID tag 24 to the respective shoe 98.

Figure 21:
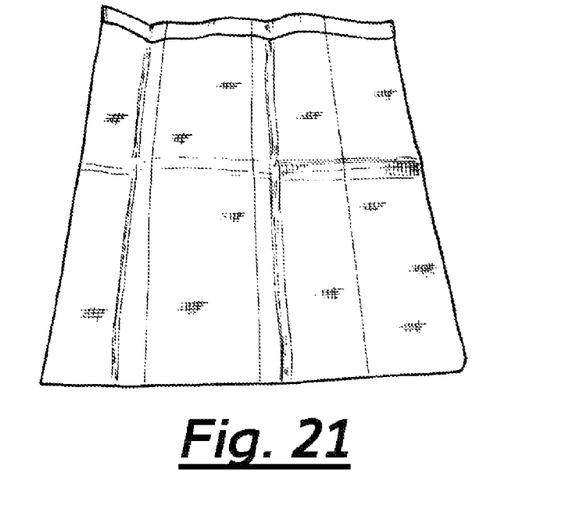
FIG. 21 shows an RFID tag according to the present invention weaved into a bag or sack.

As shown in FIG. 21, metalized thread based RFID tag can also be applied to sack or bag made of cloth or linen or plastic fiber for industrial or agricultural use, so that the contents in the sack or bag can be tracked from the farm to the factory. In such a case, the centre part housing the flip chip RFID IC needs to be properly protected (e.g. being covered by a piece of hard plastic) to protect the IC from being damaged by weight or impact, and the metalized threads of the RFID tag are woven onto or into the sack or bag. A metalized film, either in dipole far field form or loop near field form, or both, may be provided to provide long range RFID read even when the goods inside the sack contains water or meat, or even metal.

In summary, metalized thread based RFID tags can be used in many aspects of our life and provide the necessary antenna structure for best and longest range RFID read in a most natural way of attachment or integration into our clothing wear and as a wearable device.

It should be understood that the above only illustrates examples whereby the present invention may be carried out, and that various modifications and/or alterations may be made thereto without departing from the spirit of the invention.

It should also be understood that certain features of the invention, which are, for clarity, described in the context of separate embodiments, may be provided in combination in a single embodiment. Conversely, various features of the invention which are, for brevity, described in the context of a single embodiment, may also be provided separately or in any appropriate sub-combinations.

The invention claimed is:

1. A radio frequency identification (RFID) tag including an integrated circuit and at least one antenna connected with said integrated circuit, wherein said at least one antenna is formed of an at least partly metalized thread, wherein said integrated circuit is a flip chip integrated circuit mounted on a piece of FR4 printed circuit board with a plurality of metalized holes, wherein said at least one antenna is connected with at least one of said metalized holes.

2. The RFID tag according to claim 1 wherein said RFID tag is a passive RFID tag.

3. The RFID tag according to claim 1 wherein said flip chip integrated circuit is mounted on a piece of plastic inlay or on a piece of cloth.

4. The RFID tag according to claim 1 wherein two pairs of at least partly metalized thread antennas are connected to said flip chip integrated circuit.

5. The RFID tag according to claim 1 wherein said antenna is a loop style antenna.

6. The RFID tag according to claim 1 wherein said RFID tag is electrically connected with and powered by a battery.

7. A method of forming a tamper-destruct seal for an object, said method including providing at least one radio frequency identification (RFID) tag, wherein said RFID tag includes an integrated circuit and at least one antenna connected with said integrated circuit, wherein said at least one antenna is formed of an at least partly metalized thread, and associating said thread with said object, wherein said object is a document and said thread of said RFID tag is positioned through at least one hole of said document.

8. A radio frequency identification (RFID) tag including an integrated circuit and at least one antenna connected with said integrated circuit, wherein said at least one antenna is formed of an at least partly metalized thread, wherein said RFID tag includes a plurality of at least partially metalized threads, wherein at least one of said plurality of threads is a deactivator thread of a distinguishable colour relative to the other threads, said distinguishable colour providing a visual guide for identifying the deactivator thread, and wherein operation of said RFID tag is adapted to be permanently terminated upon cutting of said deactivator thread.

* * * * *